US009790413B2

(12) United States Patent
Galindo et al.

(10) Patent No.: US 9,790,413 B2
(45) Date of Patent: Oct. 17, 2017

(54) FLUOROUS ADDITIVES FOR USE IN A FLUOROUS-BASED TREATMENT FLUID

(71) Applicant: HALLIBURTON ENERGY SERVICES, INC., Houston, TX (US)

(72) Inventors: Kay A. Galindo, Houston, TX (US); Jay P. Deville, Houston, TX (US); Greg P. Perez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

(21) Appl. No.: 14/607,529

(22) Filed: Jan. 28, 2015

(65) Prior Publication Data
US 2015/0141300 A1 May 21, 2015

Related U.S. Application Data

(62) Division of application No. 13/600,601, filed on Aug. 31, 2012.

(51) Int. Cl.
| C09K 8/06 | (2006.01) |
| C09K 8/60 | (2006.01) |
| C09K 8/035 | (2006.01) |
| C09K 8/34 | (2006.01) |
| C09K 8/40 | (2006.01) |
| C09K 8/502 | (2006.01) |
| C09K 8/64 | (2006.01) |
| C09K 8/72 | (2006.01) |
| C09K 8/82 | (2006.01) |
| C09K 8/80 | (2006.01) |

(52) U.S. Cl.
CPC ............ *C09K 8/035* (2013.01); *C09K 8/34* (2013.01); *C09K 8/40* (2013.01); *C09K 8/502* (2013.01); *C09K 8/602* (2013.01); *C09K 8/605* (2013.01); *C09K 8/64* (2013.01); *C09K 8/72* (2013.01); *C09K 8/80* (2013.01); *C09K 8/82* (2013.01); *C09K 2208/08* (2013.01); *C09K 2208/32* (2013.01); *C09K 2208/34* (2013.01)

(58) Field of Classification Search
CPC .................................. C09K 8/035; C09K 8/34
USPC .................................................. 507/105, 205
See application file for complete search history.

(56) References Cited

U.S. PATENT DOCUMENTS

| 2,765,851 | A | 10/1956 | Bond | |
| 3,957,672 | A * | 5/1976 | Zisman | C11D 1/004 134/1 |
| 4,508,628 | A | 4/1985 | Walker et al. | |
| 4,557,837 | A | 12/1985 | Clark, III et al. | |
| 4,990,283 | A | 2/1991 | Visca et al. | |
| 5,125,978 | A * | 6/1992 | Flynn | B01D 12/00 134/2 |
| 6,149,980 | A | 11/2000 | Behr et al. | |
| 6,235,701 | B1 | 5/2001 | Senger Elsbernd | |
| 7,858,564 | B2 | 12/2010 | Pasquier et al. | |
| 8,176,981 | B2 | 5/2012 | Savu et al. | |
| 8,629,089 | B2 | 1/2014 | Dams | |
| 2001/0031709 | A1 * | 10/2001 | Lenti | B29C 33/62 508/182 |
| 2005/0123639 | A1 | 6/2005 | Ring | |
| 2006/0033075 | A1 | 2/2006 | Harris | |
| 2007/0117914 | A1 | 5/2007 | Hintzer et al. | |
| 2007/0123430 | A1 | 5/2007 | Pasquier et al. | |
| 2007/0142547 | A1 | 6/2007 | Vaidya et al. | |
| 2008/0161481 | A1 | 7/2008 | Abuseleme et al. | |
| 2009/0192051 | A1 | 7/2009 | Carman | |
| 2010/0090373 | A1 | 4/2010 | Takahashi | |
| 2010/0137169 | A1 | 6/2010 | Pope et al. | |
| 2010/0204067 | A1 | 8/2010 | Hoskins | |
| 2010/0270020 | A1 | 10/2010 | Baran, Jr. et al. | |
| 2010/0276149 | A1 | 11/2010 | Pope et al. | |
| 2010/0288498 | A1 | 11/2010 | Moore et al. | |
| 2010/0307831 | A1 | 12/2010 | Pasquier et al. | |
| 2012/0065108 | A1 | 3/2012 | Opstal et al. | |
| 2012/0175118 | A1 | 7/2012 | Kahtri et al. | |
| 2013/0248257 | A1 | 9/2013 | Naegel et al. | |

FOREIGN PATENT DOCUMENTS

| WO | WO2007107015 A1 | 9/2007 |
| WO | 2012010530 | 1/2012 |
| WO | WO2012010530 A1 | 1/2012 |

OTHER PUBLICATIONS

Extended Search Report, EP Application No. 13832766.3, dated Feb. 22, 2016.
ip.com, PriorArtDatabase. Technical Disclosure, Drilling Fluids Using PTFE Powder As a Lubricating Agent and Methods of Drilling in Subterranean Formations, IP.com #: IPCOM000145399D, Jan. 15, 2007.
The Eurasian Patent Organization (EAPO), The Eurasian Patent Office, Notification, Appln. No. 201492084/28, dated Dec. 28, 2016.
Canadian Intellectual Property Office, Examiner Requisition, Appln. No. 2,881,548, dated Oct. 17, 2016.
The Eurasian Patent Organization, Conclusion, Appln. 201492084/28, dated Mar. 30, 2016.
Canadian Intellectual Property Office, Examiner Requisition, Appln. No. 2,881,548, dated Apr. 7, 2016.
Australian Government IP Australia, Patent Examination Report No. 1, Appln. No. 2013309446, dated Jan. 29, 2015.

(Continued)

*Primary Examiner* — Aiqun Li
(74) *Attorney, Agent, or Firm* — McGuireWoods LLP

(57) ABSTRACT

A treatment fluid comprises: a liquid fluorinated compound; and at least one additive, wherein the additive: (A) comprises carbon and at least one fluorine functional group; and (B) is soluble or dispersible in the liquid fluorinated compound. A method of treating a portion of a well comprises: forming the treatment fluid; and introducing the treatment fluid into the well.

16 Claims, No Drawings

(56) References Cited

OTHER PUBLICATIONS

Australian Government IP Australia, Patent Examination Report No. 1, Appln. No. 2015218434, dated Mar. 15, 2016.
Patent Office of the Cooperation Council for the Arab States of the Gulf, Examination Report (First), Appln. No. 2013-25057, dated Nov. 22, 2016.
European Patent Office, Communication Pursuant to Article 94(3) EPC, Appln. No. 13382766.3, dated Jan. 30, 2017.
"Fatty acid", Wikipedia, Printed Mar. 29, 2017; https://www.cs.mcgill.ca/~rwest/link-suggestion/wpcd_2008-09_augmented/wp/f/Fatty_acid.htm; pp. 1-4.

* cited by examiner

FLUOROUS ADDITIVES FOR USE IN A FLUOROUS-BASED TREATMENT FLUID

TECHNICAL FIELD

An additive for use in a fluorous-based treatment fluid is provided. The additive comprises carbon and at least one fluorine functional group. The additive is soluble or dispersible in the fluorous-based treatment fluid. A method of treating a portion of a well is also provided. According to an embodiment, the well is an oil, gas, or water production well, or an injection well.

SUMMARY

According to an embodiment, a treatment fluid comprises: a liquid fluorinated compound; and at least one additive, wherein the additive: (A) comprises carbon and at least one fluorine functional group; and (B) is soluble or dispersible in the liquid fluorinated compound.

According to another embodiment, a method of treating a portion of a well comprises: forming the treatment fluid; and introducing the treatment fluid into the well.

DETAILED DESCRIPTION OF THE INVENTION

As used herein, the words "comprise," "have," "include," and all grammatical variations thereof are each intended to have an open, non-limiting meaning that does not exclude additional elements or steps.

It should also be understood that, as used herein, "first," "second," and "third," are assigned arbitrarily and are merely intended to differentiate between two or more additives, etc., as the case may be, and does not indicate any sequence. Furthermore, it is to be understood that the mere use of the word "first" does not require that there be any "second," and the mere use of the word "second" does not require that there be any "third," etc.

As used herein, a "fluid" is a substance having an external phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A solution is an example of a homogenous fluid, containing a solvent (e.g., water) and a solute. A colloid is an example of a heterogeneous fluid. A colloid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. There can be more than one internal phase of a colloid, but only one external phase. For example, there can be an external phase which is adjacent to a first internal phase, and the first internal phase can be adjacent to a second internal phase. Any of the phases of a colloid can contain dissolved materials and/or undissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, work-over fluids, production enhancement fluids, such as fracturing and acidizing fluids, and packer fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

A treatment fluid commonly includes one or more additives. Examples of additives commonly used include fluid loss additives, lost-circulation materials, corrosion inhibitors, lubricants, viscosifiers or suspending agents, high-temperature stabilizers, sweeping agents, emulsifiers, and oxygen scavengers.

During lost circulation of a treatment fluid, the liquid portion of the fluid can enter the subterranean formation. In order to overcome the problems associated with lost circulation, a fluid loss additive or a lost-circulation material ("LCM"), can be used. LCMs are generally non-swellable, granular-shaped substances. As the treatment fluid is placed into the well, the fluid loss additive or the LCM can eliminate or lessen the amount of fluid entering the formation. For example, the particles of the LCM can build upon each other and form a bridge over highly-permeable areas of the formation. The bridge can eliminate or reduce the amount of liquid entering the formation via the wellbore.

Another common additive is a corrosion inhibitor. A corrosion inhibitor functions to reduce or eliminate corrosion to metal well components. Yet another type of additive is a viscosifier or suspending agent. A viscosifier can increase the viscosity of a treatment fluid. Viscosity is a measure of the resistance of a fluid to flow, defined as the ratio of shear stress to shear rate. Viscosity can be expressed in units of (force*time)/area. For example, viscosity can be expressed in units of dyne*s/cm² (commonly referred to as Poise (P)), or expressed in units of Pascals/second (Pa/s). At a certain viscosity, undissolved solids can be more uniformly suspended in the liquid portion of the fluid without settling out of the liquid.

Treatment fluids are generally oil or water based. As used herein, the term "oil based" means that the fluid comprises a hydrocarbon liquid external phase or is a hydrocarbon solution. As used herein, the term "water based" means that the fluid comprises an aqueous liquid external phase or is an aqueous solution. A treatment fluid having a fluorinated liquid phase has been shown to have improved properties over oil- and water-based treatment fluids. Some of the improved properties include higher thermal stability, improved lubricity, and better shale stability. One example of a fluorinated drilling fluid is disclosed in U.S. Pat. No. 7,858,564, issued to David Pasquier, Alain Driancourt, and Annie Audibert on Dec. 28, 2010, which is hereby incorporated by reference in its entirety for all purposes. It is to be understood that if there is any conflict in the usage of a word or term in this specification and one or more patent(s) or other documents that may be incorporated herein by reference, then the definitions that are consistent with this specification should be adopted.

However, traditional additives used in oil- and water-based treatment fluids are incompatible with fluorous-based fluids. As used herein, the term "fluorous based" means that the fluid comprises a fluorous liquid external phase or is a fluorous solution. For example, the additive may not be soluble or dispersible in a fluorous-based fluid. As used herein, the term "soluble" means that at least 1 gram (g) of the solid will dissolve in 100 g of the fluid at a temperature of 71° F. (21.7° C.) and a pressure of 1 atmosphere (atm). As used herein, the term "dispersible" means solid particles will separate uniformly throughout a fluid upon agitation. It is to be understood that some clumping together of the solid particles can exist, but the majority of the solid particles should be capable of separating uniformly throughout the fluid. A need therefore exists for treatment fluid additives that are compatible with fluorous-based treatment fluids.

According to an embodiment, a treatment fluid comprises: a liquid fluorinated compound; and at least one additive, wherein the additive: (A) comprises carbon and at least one fluorine functional group; and (B) is soluble or dispersible in the liquid fluorinated compound.

According to another embodiment, a method of treating a portion of a well comprises: forming the treatment fluid; and introducing the treatment fluid into the well.

It is to be understood that the discussion of preferred embodiments regarding the treatment fluid or any ingredient in the treatment fluid, is intended to apply to the composition embodiments and the method embodiments. Any reference to the unit "gallons" means U.S. gallons. Any discussion of a particular ingredient or fluid of an embodiment (e.g., an additive) is meant to include the singular form of the ingredient or fluid and also the plural form of the ingredient or fluid, without the need to continually refer to the ingredient or fluid in both the singular and plural form throughout. For example, if a discussion involves "the additive," it is to be understood that the discussion pertains to one additive (singular) and two or more additives (plural).

The treatment fluid can be, without limitation, a drilling fluid, spacer fluid, completion fluid, work-over fluid, production enhancement fluid (e.g., fracturing and acidizing fluid), or a packer fluid.

The treatment fluid comprises a liquid fluorinated compound. The liquid fluorinated compound comprises carbon and at least one fluorine functional group. The liquid fluorinated compound can also comprise multiple fluorine functional groups. The fluorinated liquid compound can contain other functional groups, for example, other halogenated groups other than fluorinated, or hydrocarbon-containing groups. The liquid fluorinated compound can contain perfluorinated liquids as the fluorinated liquid, more specifically perfluoropolyalkylethers (also referred to as perfluoropolyethers or PFPE) and their derivatives. PFPEs are a single class of fluorinated polymers that are liquid at ambient temperature and have particular characteristics such as low interfacial energy, high lubricating power, very high thermal and chemical resistance, and low toxicity. The liquid fluorinated compound can have a density in the range from 1,800 kilograms per cubic meter (kg/m³) to 2,000 kg/m³. Commercially-available PFPE liquids include: Krytox®, available from Dupont in Wilmington, Del., USA; Fomblin®, available from Solvay Plastics in Alpharetta, Ga., USA; and Demnum®, available from Daikin Company in Orangeburg, N.Y., USA.

The treatment fluid can be a solution or a colloid. For a solution, the liquid fluorinated compound can be the solvent. If the treatment fluid is a solution, then the additive can be the solute. For a colloid, the treatment fluid can be a slurry, an emulsion, or a foam. For a colloid, the liquid fluorinated compound can be the external phase of the treatment fluid. Regardless of the type of colloid, any of the phases of the colloid (i.e., the external and internal phases) can contain dissolved and/or undissolved ingredients. For a colloid: the additive can be the internal phase of the colloid; the additive can be the solute of any of the phases of the colloid; or the additive can be an undissolved solid in any of the phases of the colloid. By way of example, if the treatment fluid is a foam, then the external phase of the foam can be the liquid fluorinated compound, the additive can be a solute making up the external phase, and a gas can be the internal phase of the foam. By way of another example, if the treatment fluid is a foam, then the external phase of the foam can be the liquid fluorinated compound, the additive can be an undissolved solid as a first internal phase, and a gas can be a second internal phase of the foam. By way of yet another example, the treatment fluid can be a slurry wherein the liquid fluorinated compound is the external phase and the additive is the internal phase.

The treatment fluid comprises the additive. The additive comprises carbon and at least one fluorine functional group and is soluble or dispersible in the liquid fluorinated compound. The additive can also comprise two or more fluorine functional groups. The additive can contain only carbon and fluorine atoms (commonly called a perfluorinated compound). A perfluorinated compound can also contain other atoms in addition to carbon and fluorine. According to another embodiment, the additive also includes other atoms in addition to carbon and fluorine atoms. For example, the additive can further comprise hydrogen, oxygen, or other atoms.

The additive can be a fluoropolymer. Fluoropolymers share the properties of fluorocarbons in that they are not as susceptible to the van der Waals force as hydrocarbons. This contributes to their non-stick and friction reducing properties. Moreover, fluoropolymers are stable due to the stability that multiple carbon-fluorine bonds add to a chemical compound. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various ways along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two polymer molecules. A cross-link between two polymer molecules can be formed by a direct interaction between the polymer molecules, or conventionally, by using a cross-linking agent that reacts with the polymer molecules to link the polymer molecules.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight for a copolymer can be expressed as follows:

$$\text{Avg. molecular weight} = (M.W.m_1 * RU\ m_1) + (M.W.m_2 * RU\ m_2)\ldots$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on. According to an embodiment, the fluoropolymer has a molecular weight such that the additive is soluble or dispersible in the liquid fluorinated compound.

The fluoropolymer can be a homopolymer or a copolymer. Of course the fluoropolymer can also be a cross-linked polymer. According to an embodiment, the fluoropolymer is a random, alternating, periodic, or block copolymer. The monomer residue(s) used to form the fluoropolymer can be selected from the group consisting of ethylene, propylene, vinyl fluoride, vinylidene fluoride, tetrafluoroethylene (TFE), hexafluoropropylene (HFP), perfluoropropylvinylether (PPVE), perfluoromethylvinylether (PMVE), chlorotrifluoroethylene (CTFE), polytetrafluoroethylene (PTFE), and any combination thereof. The fluoropolymer can also contain other monomer residues not specifically listed above.

The additive can be selected from the group consisting of perfluoropolystyrene, perfluoropolytert-butylstyrene, perfluoropolymethylstyrene acrylates, polytetrafluoroethylene (PTFE), perfluorinated polystyrene, perfluoropolyalkylethyl acrylates, perfluoropolyalkylethyl methacrylates, perfluoropolyalkyl acrylates, perfluorinated polyamides, fluorinated polyamides, perfluoropolyacrylamides, PTFE-polyamides, perfluorinated tall oil fatty amides, fluorinated polysaccharides, perfluorinated fatty acids, perfluorinated tall oil fatty acids, perfluoropolystyrenebutadienes, perfluoropolyethylene ethene/butene copolymer, PTFE fibers, fluorinated fibers, perfluorinated resins, fluorinated telomers, fluorinated telomer alcohols, fluorinated elastomers, tetrafluoropropanol, octafluoropentanol, dodecafluoroheptanol, derivatives of any of the foregoing, and combinations thereof.

The treatment fluid can also contain two or more additives. By way of example, the treatment fluid can contain a first additive and a second additive. Of course the treatment fluid can also contain a third, fourth, and so on additive. The additives can be different. For example, the first additive can be a fluorinated polysaccharide and the second additive can be tetrafluoro propanol.

The additive can be a fluid loss additive, lost-circulation material, corrosion inhibitor, lubricant, viscosifier or suspending agent, sweeping agent, emulsifier, or oxygen scavenger. The chemical structure of the additive can be selected depending on the type of additive. The following examples are given to illustrate possible chemical structures for the type of additive. The following examples are not the only examples that could be given for a particular type of additive and are not meant to limit the scope of the invention.

For a fluid loss additive—perfluoropolystyrene, perfluoropolytert-butylstyrene, perfluoropolymethylstyrene acrylates, polytetrafluoroethylene (PTFE), perfluoropolyalkylethyl acrylates, perfluoropolyalkylethyl methacrylates, perfluoropolyalkyl acrylates, perfluorinated polyamides, perfluoropolyacrylamides, PTFE-polyamides, fluorinated polyamides, perfluorinated tall oil fatty amides, perfluoropolystyrenebutadienes, and perfluoropolyethylene ethene/butene copolymer. For a corrosion inhibitor—perfluoropolystyrene, perfluoropolytert-butylstyrene, perfluoropolymethylstyrene acrylates, and polytetrafluoroethylene (PTFE). For a lubricant—perfluoropolystyrene, perfluoropolytert-butylstyrene, perfluoropolymethylstyrene acrylates, polytetrafluoroethylene (PTFE), perfluorinated polystyrene, PTFE fibers, fluorinated fibers, perfluorinated resins, and fluorinated telomers. For a viscosifier or suspending agent—perfluorinated polyamides, perfluoropolyacrylamides, PTFE-polyamides, fluorinated polyamides, perfluorinated tall oil fatty amides, fluorinated polysaccharides, perfluorinated fatty acids, perfluorinated tall oil fatty acids, perfluoropolystyrenebutadienes, and perfluoropolyethylene ethene/butene copolymer. For a lost-circulation material and sweeping agent—PTFE fibers, fluorinated fibers, PTFE-polyamides, fluorinated polyamides, perfluorinated resins, and fluorinated telomers. For an emulsifier—fluorinated telomer alcohols, tetrafluoropropanol, octafluoropentanol, and dodecafluoroheptanol.

According to an embodiment, the concentration of the additive is selected such that the additive functions for the intended purpose. By way of example, the functionality of a corrosion inhibitor is generally measured by the amount of corrosion loss to a metal or metal alloy in units of mils per year (mpy). A corrosion inhibitor that yields a corrosion loss of less than or equal to 50 mpy at a specific temperature and pressure is considered to function effectively as a corrosion inhibitor. According to this example, the additive can be in at least a sufficient concentration such that the treatment fluid yields a corrosion loss of less than or equal to 50 mpy at a specific temperature and pressure. By way of another example, the functionality of a fluid loss additive is generally measured by the API or HPHT fluid loss in units of milliliters per 30 minutes (mL/30 min). According to this example, the additive can be in at least a sufficient concentration such that treatment fluid has an API or HPHT fluid loss of less than 150 mL/30 min at a specific temperature and pressure. By way of yet another example, the functionality of a lost-circulation material is generally measured by the sealing pressure of the material in units of pounds force per square inch (psi). According to this example, the additive can be in at least a sufficient concentration such that additive has a sealing pressure of at least 30 psi (0.2 megapascals "MPa").

The treatment fluid can include additional additives including, but not limited to, a high-temperature stabilizer, a pH buffer, a weighting agent, an acid, proppant, an alkalinity source, a shale stabilizer, a biocide, a scavenger, a surfactant, a thinner, a flocculent, a deflocculent, a bridging agent, a breaker, and a dispersant. The exact additional additives that can be included depends on the type of treatment fluid being introduced into the well. For example, a drilling fluid might further include a weighting agent, an acidizing fluid might further include an acid, and a fracturing fluid might further include proppant.

The treatment fluid can further include a high-temperature stabilizer. The high-temperature stabilizer can be selected from the group consisting of alkylene diamines, arylamines, benzimidazole, phenyl-β-naphthylamine, triphenylimidazole, triphenylphosphine sulfide, tetraphenylhydrazine, tetraphenyltetrazocine, perfluorotriphenylphosphine, phenothiazine, phenyl diselenide, perfluoroalkylether phosphines, diphosphatetraazacyclooctatetraenes, monodiphospha-s-triazines, diphospha-s-triazines, derivatives of any of the foregoing, and any combination thereof. According to an embodiment, the treatment fluid further includes the high-temperature stabilizer when the bottomhole temperature of the well is greater than 302° F. (150° C.). As used herein, the term "bottomhole" means the portion of the well to be treated. According to another embodiment, the treatment fluid further includes the high-temperature stabilizer when the treatment fluid is likely to come in contact with a metal or metal oxide.

The treatment fluid can include a pH buffer. The pH buffer can be selected from the group consisting of magnesium oxide, potassium hydroxide, calcium oxide, and calcium hydroxide. Commercially-available examples of a pH buffer include BARABUF®, marketed by Halliburton Energy Services, Inc.

The treatment fluid can further include a weighting agent. The weighting agent can be selected from the group consisting of barite, hematite, manganese tetroxide, calcium carbonate, and combinations thereof. Commercially-available examples of a suitable weighting agent include, but are not limited to, BAROID®, BARACARB®, BARODENSE®, MICROMAX™, and combinations thereof, marketed by Halliburton Energy Services, Inc.

The methods include the step of forming the treatment fluid. The treatment fluid can be formed ahead of use or on the fly. The methods include the step of introducing the treatment fluid into the well. The methods can further include the step of introducing a second, third, and so on treatment fluid into the well. The step of introducing can comprise pumping the treatment fluid into the well. The well can be, without limitation, an oil, gas, or water production well, or an injection well. The step of introducing can include introducing the treatment fluid into an annulus. According to an embodiment, the well penetrates a reservoir or is located adjacent to a reservoir. The methods can further include the step of removing at least a portion of the treatment fluid after the step of introducing.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b,") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a liquid fluorinated compound;
   and at least one additive, wherein the additive:
   (A) comprises carbon and at least one fluorine functional group;
   (B) is soluble or dispersible in the liquid fluorinated compound; and
   (C) is selected from the group consisting of perfluoropolystyrene, perfluoropolytert-butylstyrene, perfluorinated polystyrene, perfluorinated polyamides, fluorinated polyamides, perfluoropolyacrylamides, perfluorinated tall oil fatty amides, fluorinated polysaccharides, perfluoropolystyrenebutadienes, and combinations thereof,
   wherein the liquid fluorinated compound includes at least one other halogenated functional group other than a fluorine functional group.

2. The fluid according to claim 1, wherein the liquid fluorinated compound comprises a perfluorinated liquid compound.

3. The fluid according to claim 1, wherein the treatment fluid is a solution.

4. The fluid according to claim 3, wherein the liquid fluorinated compound is the solvent and the additive is the solute.

5. The fluid according to claim 1, wherein the treatment fluid is a colloid.

6. The fluid according to claim 5, wherein the treatment fluid is a slurry, an emulsion, or a foam.

7. The fluid according to claim 6, wherein the liquid fluorinated compound is the external phase of the treatment fluid, and wherein the additive is the internal phase of the colloid;
   the solute of any of the phases of the colloid; or is an undissolved solid in any of the phases of the colloid.

8. The fluid according to claim 1, wherein the additive comprises two or more fluorine functional groups.

9. The fluid according to claim 1, wherein the treatment fluid comprises two or more additives.

10. The fluid according to claim 1, wherein the additive is a fluid loss additive, lost-circulation material, corrosion inhibitor, lubricant, viscosifier or suspending agent, sweeping agent, emulsifier, or oxygen scavenger.

11. The fluid according to claim 1, wherein the treatment fluid further comprises at least one additional additive.

12. The fluid according to claim 11, wherein the at least one additional additive is a high-temperature stabilizer, a pH buffer, a weighting agent, an acid, proppant, an alkalinity source, a shale stabilizer, a biocide, a scavenger, a surfactant, a thinner, a flocculent, a deflocculent, a bridging agent, a breaker, and a dispersant.

13. The fluid according to claim 12, wherein the high-temperature stabilizer is selected from the group consisting of alkylene diamines, arylamines, benzimidazole, phenyl-.beta.-naphthylamine, triphenylimidazole, triphenylphosphine sulfide, tetraphenylhydrazine, tetraphenyltetrazocine, perfluorotriphenylphosphine, phenothiazine, phenyl diselenide, perfluoroalkylether phosphines, diphosphatetraazacyclooctatetraenes, monodiphospha-s-triazines, diphospha-s-triazenes, derivatives of any of the foregoing, and any combination thereof.

14. A treatment fluid comprising:
    a liquid fluorinated compound, wherein the liquid fluorinated compound comprises carbon and at least one fluorine functional group; and
    at least one additive, wherein the additive:
    (A) comprises carbon and at least one fluorine functional group;
    (B) is soluble or dispersible in the liquid fluorinated compound;
    (C) is a fluoropolymer; and
    (D) wherein a monomer residue used to form the fluoropolymer is selected from the group consisting of vinyl fluoride, vinylidene fluoride, perfluoropropylvinylether (PPVE), perfluoromethylvinylether (PMVE), chlorotrifluoroethylene (CTFE), and any combination thereof,
    wherein the liquid fluorinated compound includes at least one other halogenated functional group other than a fluorine functional group.

15. A treatment fluid of claim 14, wherein the treatment fluid is a drilling fluid, spacer fluid, completion fluid, workover fluid, production enhancement fluid, or a packer fluid.

16. The treatment fluid of claim 14, wherein the monomer residue used to form the fluoropolymer is vinyl fluoride.

* * * * *